May 17, 1966  L. C. FRAZIER  3,251,725
BAND BUILDING APPARATUS FOR TIRE BUILDING MACHINE
Filed May 24, 1962  2 Sheets-Sheet 1
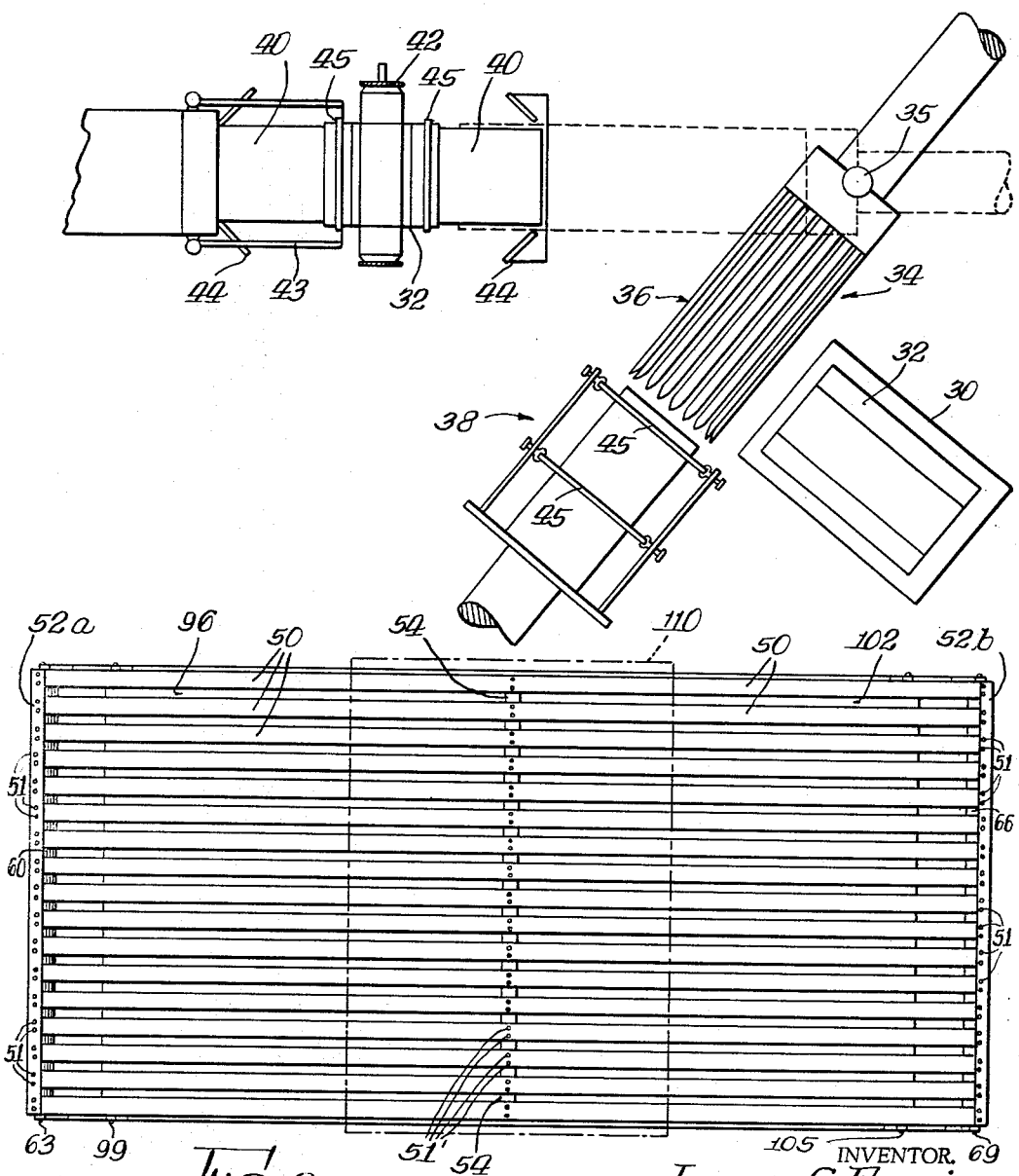
INVENTOR.
Larry C. Frazier,
BY Brown, Jackson,
Boettcher & Dienner
Att'ys.

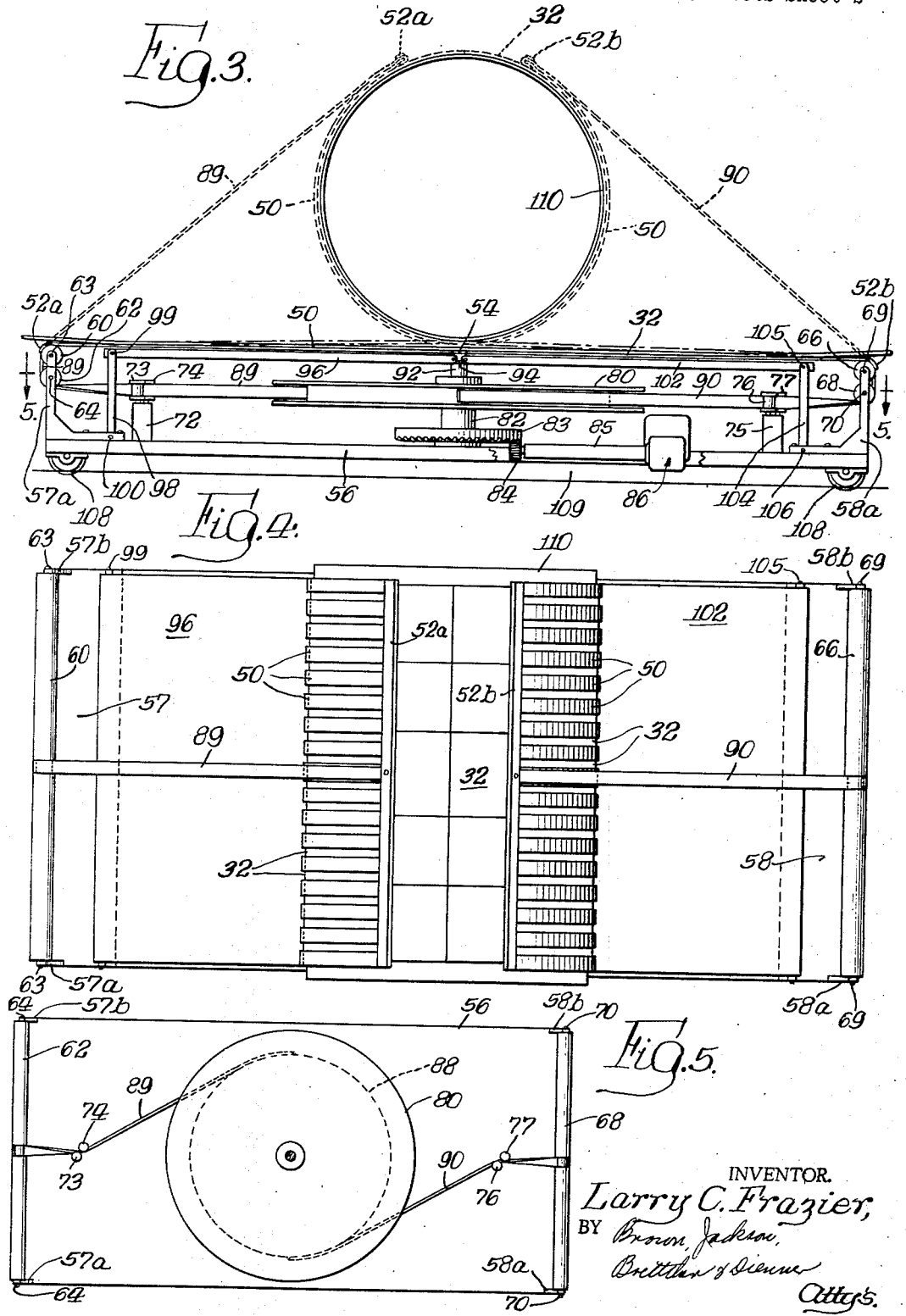

United States Patent Office 3,251,725
Patented May 17, 1966

3,251,725
BAND BUILDING APPARATUS FOR TIRE
BUILDING MACHINE
Larry C. Frazier, Prescott, Ariz., assignor to National-Standard Company, Niles, Mich., a corporation of Delaware
Filed May 24, 1962, Ser. No. 197,480
10 Claims. (Cl. 156—412)

The present invention relates to apparatus for building pneumatic tires. More specifically, the invention relates to apparatus for wrapping a tire fabric ply about a cylindrical member, for example, a tire forming drum or inflatable tire building bag, or, in accordance with an embodiment to be described hereinafter, for wrapping a fabric ply about a mandrel comprising an expandable generally drum-like structure including a plurality of circumferentially spaced steel fins movable radially between expanded and relaxed positions.

In accordance with known practice, it is common to construct a pneumatic tire over an expansible cylindrical drum by assembling on the drum the usual tire components comprising the tire beads, tread breaker strips, side walls, chafing strips, tread and other desired components, whereby after the carcass is completed thereon the drum is deflated and the carcass band removed for shaping and curing. The latter operation comprises expanding the carcass band, including the tread, into an annular tire shape and holding the same in a mold during a curing operation.

In my U.S. Patent 2,986,196, issued May 30, 1961, which is assigned to the assignee of the present invention, there is described an improved tire building machine comprising a drum assembly which is mounted in cantilever fashion and presents a cylindrical surface on which a tire carcass may be formed. In the operation of the apparatus described in the above U.S. patent, the desired tire components are applied to the drum, a band of tire fabric being first constructed on the drum, and then a pair of inextensible bead rings being applied in predetermined axially spaced relation so as to encircle the band.

The drum includes an inflatable building bag which, when inflated, is confined by the bead rings at preselected areas so as to expand different sections of a tire carcass to distinctly different diameters and thereby to turn or flip fabric tightly about the inextensible bead rings. In other words, the expansion of the tire building bag produces an intermediate annular torus section and two annular sections one at each end of the intermediate section separated by the pair of bead rings, whereby the carcass fabric is automatically folded about the bead rings and the latter are thus anchored in the carcass. For a more complete description of the structure and operation of the inflatable tire building bag or drum referred to, reference is made to the above-identified patent.

It will be noted that with regard to the aforegoing kown methods of tire manufacture, one step in the operation requires that a tire fabric ply be wrapped about a tire building drum or inflatable tire building bag and spliced so as to form a cylindrical band. In my co-pending application Serial No. 197,397, filed of even date herewith, I have described a further method of tire manufacture utilizing an expandable mandrel comprising a plurality of circumferentially spaced steel fins mounted on a common support at one end and free at their opposite ends, the steel fins being movable radially to expanded and relaxed positions.

In the operation of my expandable mandrel, it is first necessary to wrap a band of tire fabric about the several steel fins and thereafter to apply a pair of bead rings over the band, after which the steel fins are telescoped over a tire building drum or tire building bag, for exaxmple, of the type described in the above-mentioned U.S. Patent 2,986,196, in order to deposit the cylindrically formed band and bead ring assembly on the drum. The mandrel is then removed and the drum is expanded to form a tire. Apparatus for placing a pair of bead rings over a cylindrically formed band and sealing the beads thereto is described in my co-pending application Serial No. 197,504, also owned by the present assignee and filed of even date herewith.

The present invention may be used to advantage in conjunction with any of the foregoing methods of tire manufacture as well as in numerous and varied other applications where it is desired to wrap a fabric ply about a drum or the like to form a cylindrical fabric band.

Various devices have heretofore been proposed for applying tire fabric to a drum or mandrel. One such known mechanism comprises a flexible belt associated with a pair of arcuate arms whereby the latter may be raised to encompass the drum or the like so as to wrap the belt and a fabric ply positioned thereon about the drum.

It is an object of the present invention to provide an improved band building apparatus which is unusually simple in its operation and comprises a relatively small number of moving parts.

A further object of the invention is to provide band building apparatus which is relatively inexpensive to manufacture and is particularly dependable in operation.

Still another important object of the invention is to provide band building apparatus comprising fabric applier members which are pre-set so as to naturally assume an arcuate configuration conforming generally to the configuration of a drum on which a fabric band is to be constructed, whereby said members may be utilized to construct a band on a drum or the like by simply releasing the members in a controlled manner so as to permit them to assume a preformed shape whereby they wrap about a drum or cylindrical member and thereby construction a band of fabric thereon.

In furtherance of the above objects, I provide a plurality of metal strips which are pre-set or tempered in the form of a ring, and I secure the ends of the strips to a pair of common support bars whereby upon positive movement of the support bars to a given position the strips will be straightened out and held substantially flat so as to permit a build-up ply of tire fabric or the like to positioned thereon. Thereafter, upon releasing the support bars, preferably in a controlled manner, the pre-set strips will wrap themselves about a drum positioned immediately above them so as to wrap the fabric about the drum, after which the fabric may be spliced to complete a band.

In accordance with a preferred embodiment of the invention, I provide a plurality of pre-set tempered steel strips secured at their opposite ends to a pair of transverse support bars. Beneath the steel strips I provide a supporting platform, and under the platform there is provided a reel which has secured thereto a pair of belts, one belt being attached to each of the two support bars. Accordingly, upon rotation of the reel to take up the belts, the support bars are drawn downwardly to straighten out the strips and hold them in flat condition against the supporting platform so as to be adapted to receive a built-up ply of tire fabric thereon. Upon rotation of the reel in the opposite direction to let out the belts, the strips being pre-set in the form of a ring will wrap themselves about a mandrel or drum positioned thereabove and will apply the fabric ply about the mandrel. In conjunction with the foregoing, I provide a carriage to permit the band building mechanism to be moved under a drum or mandrel on which fabric is to be wrapped, and I provide means for raising the central portion of the supporting platform and the steel strips to cause the central portion of the fabric ply to be engaged against the underside of the drum prior to permitting the strips to wrap themselves and the fabric about the drum.

The foregoing and other objects and advantages of the invention will be apparent from the following description thereof.

Now, in order to acquaint those skilled in the art with the manner of utilizing and practicing my invention, I shall describe, in conjunction with the accompanying drawings, certain preferred embodiments of my invention.

In the drawings:

FIGURE 1 is a reduced diagrammatic plan view illustrating by way of example the band building apparatus of the present invention in conjunction with certain other apparatus with which it may be advantageously used in the manufacture of pneumatic tires;

FIGURE 2 is a plan view showing the band building apparatus in its substantially flat condition wherein a sheet or ply of fabric may be positioned thereon in preparation for wrapping a band about a drum or the like, the latter being indicated in dash-dot lines to show its relative position;

FIGURE 3 is an end elevational view showing the mechanism in solid lines with a substantially flat fabric ply positioned thereon and showing in dash lines the position of the mechanism as the band is wrapped about a drum;

FIGURE 4 is a plan view illustrating the apparatus in the position shown in dash lines in FIGURE 3; and FIGURE 5 is a reduced view, taken substantially along the line 5—5 of FIGURE 3, illustrating in particular a reel and belt actuating mechanism which serves to control the movement of the band building apparatus between the position shown in solid lines and the position shown in dash lines in FIGURE 3.

Referring to FIGURE 1, there is shown a ply applicator or band builder 30 having a built-up tire fabric ply 32 positioned flat thereon. A band mandrel 34 is pivotally mounted at 35 for rotational movement in a horizontal plane between the position shown in solid lines and the position shown in dash lines. The mandrel 34 comprises a plurality of circumferentially spaced steel fins or the like 36 which form a drum-like structure about which the tire fabric 32 is wrapped, after which the fabric is spliced to form a cylindrical band. Once a cylindrical band of fabric 32 is formed about the steel fins 36, the next step in the tire making cycle being described is to place a pair of bead rings over the band. A bead placing and sealing member is shown at 38 and, as described in the aforementioned co-pending application, Serial No. 197,504, the member 38 places a pair of bead rings over a cylindrical band 32 on the steel fins 36 and seals the beads to the band.

FIGURE 1 further shows an inflatable tire building bag 40, a tread applier carriage 42, a band positioner 43, and a pair of pusher rings 44. When the band and bead rings are properly positioned on the mandrel 34, the latter is rotated to the position shown in dotted lines and is then moved axially toward the tire building bag 40 whereby the steel fins 36 are telescoped over the building bag so as to deposit the band and bead ring assembly on the bag, after which the mandrel 34 is moved axially away from the bag. A band 32 and a pair of bead rings 45 are shown in position on the building bag 40. The structure and mode of operation of the mandrel 34 are described in detail in my above-mentioned co-pending application, Serial No. 197,397.

When the band 32 and bead rings 45 are properly positioned on the building bag 40, the bag is inflated so as to expand the same radially outwardly into a tire tread held by the tread carrier 42, and also to turn or flip fabric tightly about the inextensible bead rings 45. The latter operation is fully described in my above-mentioned U.S. Patent 2,986,196.

The band building apparatus 30 of the present invention will now be described in detail, and it will be seen that the apparatus is suitable not only for wrapping a built-up tire fabric ply about a member such as the mandrel 34, but that it may be utilized to construct a cylindrical band directly on a tire building member such as the building bag 40, or on any other type of cylindrical mandrel or drum.

As shown in FIGURE 2, a plurality of parallel steel strips 50 are riveted or otherwise secured by fasteners 51 at their outer ends to a pair of transverse bars 52a and 52b, and secured by fasteners 51' at their central portions to a transverse bar 54. The bars 52a, 52b and 54 are substantially parallel to one another and extend across the full width of the several steel strips 50. In the embodiment shown, seventeen of the strips 50 are provided, and they are uniformly spaced apart along the length of the aforementioned transverse bars.

Referring to FIGURES 3 and 4, a carriage frame or base 56 is provided at one end with a bracket 57 comprising a pair of upright spaced apart support members 57a and 57b, and at its opposite end with a second bracket 58 comprising a pair of upright support members 58a and 58b. As shown in FIGURE 4, the support members 57a and 57b are disposed at opposite sides of the carriage frame 56 at the left-hand side thereof, while the supports 58a and 58b are disposed in similar fashion at the right-hand side of the carriage. Mounted between the upright supports 57a and 57b are a pair of vertically spaced horizontal rolls 60 and 62, the upper roll 60 being rotatably mounted on a rod 63 which is carried by the supports, and the lower roll 62 being carried on a rod 64 which is also mounted by the upright supports. In a similar manner, a pair of vertically spaced horizontal rolls 66 and 68 are mounted above the right-hand side of the frame on rods 69 and 70 which extend between the supports 58a and 58b so as to be mounted thereon. The four rolls 60, 62, 66 and 68 each extend the full width of the several steel strips 50.

An upright support 72 mounted on the carriage 56 carries a pair of vertically disposed idler pulleys 73 and 74 (see FIGURES 3 and 5) and a similar upright support 75 carries a pair of vertically disposed idler pulleys 76 and 77.

At the central portion of the carriage frame 56 a relatively large diameter reel 80 is mounted for rotation about a vertical axis. The reel 80 is provided with a hub or sleeve 82 which has integral therewith a gear 83 adapted to be driven by a pinion 84, the latter being operatively associated through a drive shaft 85 with a motor 86 which is mounted on the carriage frame. Attached to opposite sides of the core 88 of the reel are two belts 89 and 90. The belt 89, which has one end secured to one side of the reel core, passes between the idler pulleys 73 and 74 and then over the rolls 62 and 60, the other end thereof being secured at the center of the transverse bar 52a. The belt 90, which has one end secured to the opposite side of the reel core 88, passes between the idler pulleys 76 and 77 and then over the rolls 68 and 66, the other end being secured at the center of the transverse bar 52b.

It is an important feature of the present invention that the steel strips 50 are each tempered in the form of a ring so that when not held in a flat condition as in FIGURE 2, they are adapted to wrap themselves about a cylindrical member on which tire fabric is to be constructed. The strips 50 are spaced from one another to allow free movement of each. They may be fabricated from various resilient materials other than steel, but preferably are made of tempered steel, the thickness of which is dependent upon the size of the cylindrical fabric band to be constructed.

In accordance with the invention, the strips 50 are initially held flat and a built-up fabric ply is positioned thereon, after which the strips are permitted to wrap themselves about a cylindrical mandrel or drum to apply the material thereto. Preferably, the strips are tempered in the form of a ring with a radius somewhat smaller than the cylindrical member or mandrel to assure that the strips will wrap themselves tightly about the mandrel.

FIGURE 3 shows a hydraulic cylinder 92 within which is mounted a piston which is secured to a rod 94, whereby the latter is movable upwardly and downwardly in the cylinder 92 by conduction of fluid under pressure through a suitable inlet (not shown) in the cylinder.

A large flat platform section 96 is hingedly connected at the center of the apparatus to the piston rod 94, and the outer side edge of the platform is supported on a rocker arm 98, the latter being hinged to the platform at 99 and being hinged to the carriage frame at 100. In a similar manner, a second flat platform section 102 is hingedly connected at the center of the apparatus to the piston rod 94, and the outer side edge of the platform is supported on a rocker arm 104 which is hinged to the platform at 105 and to the carriage frame at 106. The platforms 96 and 102 extend substantially the full width of the several steel strips 50 and serve as a support therefor.

The operation of the band building apparatus of the present invention will now be described. The motor 86 is first operated to rotate the reel 80 to take up the belts 89 and 90 and thereby draw the bars 52a and 52b downwardly against the upper rolls 60 and 66, as shown in FIGURE 2 and also in solid lines in FIGURE 3. In this manner, the steel strips 50 are straightened out and held flat against the supporting platforms 96 and 102. A built-up ply 32 of tire fabric is then positioned flat on the steel strips 50. Normally the ply 32 will be of a greater length than the steel strips so as to overhang the latter as shown in FIGURE 3. It should be noted that at this time the piston rod 94 is in its lowered position within the cylinder 92.

The carriage frame 56 is mounted on four flanged wheels 108 adapted to roll on a track or the like 109. The carriage is thus rolled along the track 109 until positioned beneath a cylindrical member 110 on which a fabric band is to be constructed. When the carriage is positioned directly beneath the cylindrical member 110, fluid under pressure is conducted to the cylinder 92 to move the piston rod 94 upwardly. Upward movement of the rod 94 causes the inner ends of the platform sections 96 and 102 and also the transverse bar 54 to be moved upwardly until the fabric ply 32 is in contact with the underside of the cylindrical member. Such upward movement of the platforms 96 and 102 is permitted due to the fact that the rocker arms 98 and 104 which support the outer edges of the platform sections are free to pivot at the hinges 100 and 106.

With the fabric ply 32 in contact with the cylindrical member 110, the motor 86 is then operated to rotate the reel 80 in its opposite direction to let out the belts 89 and 90, whereby the pre-set tempered steel strips 50 will wrap themselves about the cylinder 110 and thereby wrap the fabric about the cylinder. The latter position of the steel strips 50 is shown in dotted lines in FIGURE 3 and in solid lines in FIGURE 4. It will be noted that the length of the strips 50 is less than the circumference of the cylindrical member 110 so that sufficient clearance will remain at the upper portion of the cylindrically formed band of tire fabric to permit the splicing thereof.

After the fabric band is spliced, the reel 80 is rotated to take up the belts 89 and 90 and again draw the bars 52a and 52b downwardly against the rolls 60 and 66 so as to straighten out the steel strips 50, after which the piston rod 94 is lowered, thus lowering the platform sections 96 and 102 and the bar 54 to again provide a flat surface adapted to receive a further built-up ply.

It should be understood that the band building apparatus of the present invention has been described in conjunction with certain other apparatus for making tires, as illustrated in FIGURE 1, merely by way of example to illustrate one application of the present invention. It will be readily understood by those skilled in the art that the present invention has general utility in the tire construction art as a means for wrapping fabric about a cylindrical drum or the like. Thus, various modifications and rearrangements may be made in the embodiments selected for disclosing my invention without departing from the spirit and scope of the invention.

I claim:

1. Apparatus for wrapping a fabric ply about a cylindrical drum or the like, comprising, in combination, a flexible member made of resilient material pre-set in an arcuate shape, substantially flat support means disposed beneath said flexible member, and control means connected to opposite ends of said flexible member, said control means being movable to a first position to pull on said ends of said flexible member and thereby straighten out said flexible member in a substantially flat condition on said support means to permit a fabric ply to be positioned on said flexible member, and said control means subsequently being movable to a second position to release said flexible member from its straightened condition and permit the same to assume a shape generally approaching its pre-set arcuate form, the latter movement of said control means being effected after a fabric ply is positioned on said flexible member whereby said fabric ply may be wrapped about a drum disposed adjacent said flexible member.

2. The invention of claim 1 wherein said flexible member is pre-set in a generally ring-shaped form.

3. The invention of claim 1 wherein said flexible member comprises a relatively thin steel strip which is pre-set in a generally ring-shaped form.

4. The combination of claim 3 wherein said means for holding said strip comprises a pair of belt members attached to opposite sides of a reel core with one belt being secured to one end of said strip and the other belt secured to the other end of said strip whereby upon rotation of said reel to take up said belts said strip will be moved to a substantially flat condition and upon rotation of said reel to let out said belts said strip will assume a shape generally similar to its pre-set ring-shaped form.

5. The invention of claim 1 wherein said flexible member comprises a plurality of relatively thin flexible strips made of a resilient material and arranged in parallel spaced apart relation with each of said strips being pre-set in an arcuate shape.

6. The invention of claim 5 wherein said flexible strips comprise steel strips which are pre-set in a generally ring-shaped form.

7. The invention of claim 6 wherein said flexible strips comprise steel strips which are pre-set in a ring-shaped form having a radius smaller than the radius of a cylindrical drum on which fabric is to be applied.

8. Apparatus for wrapping a fabric ply about a cylindrical drum or the like, comprising, in combination, a plurality of relatively thin flexible strips made of a resilient material and arranged in parallel spaced apart relation, each of said strips being pre-set in a generally ring-shaped form and adapted to be straightened out and temporarily held flat upon application of force thereto, a platform disposed beneath said strips for supporting the same when in their substantially flat condition, and a reel having a pair of belts attached to opposite sides of its core with one of said belts secured to said strips at one end thereof and the other of said belts secured to said strips at the other end thereof whereby upon rotation of said reel to take up said belts said strips will be drawn into a substantially flat condition supported on said platform and when said reel is rotated to let out said belts said strips will assume a shape generally similar to their pre-set ring-shaped form for wrapping a fabric ply positioned thereon about a drum disposed adjacent said strips.

9. The combination of claim 8 wherein means are provided for raising the central portions of said strips so as to permit fabric ply positioned thereon to be brought into contact with an adjacent cylindrical drum prior to rotating said reel to let out said belts and effect wrapping of said ply about said drum.

10. Apparatus for wrapping a fabric ply about a cylindrical drum or the like, comprising, in combination, a plurality of relatively thin steel strips arranged in parallel spaced apart relation, each of said strips being pre-set in a generally ring-shaped form and adapted to be straightened out and temporarily held flat upon application of force thereto, a pair of platform sections hingedly mounted beneath said strips for supporting the same when in their substantially flat condition, a reel having a pair of belts attached to opposite sides of its core with one of said belts secured to said strips at one end thereof and the other of said belts secured to said strips at the other end thereof whereby upon rotation of said reel to take up said belts said strips will be drawn into a substantially flat condition supported on said platform sections and when said reel is rotated to let out said belts said strips will assume a shape generally similar to their pre-set ring-shaped form for wrapping a fabric ply positioned thereon about a drum disposed adjacent said strips, and means for raising the central portions of said platforms and said strips to permit fabric ply positioned thereon to be brought into contact with an adjacent cylindrical drum prior to rotating said reel to let out said belts and effect wrapping of said ply about said drum.

References Cited by the Examiner
UNITED STATES PATENTS

| | | | |
|---|---|---|---|
| 2,517,889 | 8/1950 | Kuffler | 156—126 |
| 2,871,912 | 2/1959 | Kraft | 156—126 |
| 2,878,857 | 2/1959 | Smith et al. | 156—394 |
| 2,936,813 | 5/1960 | Haase | 156—126 |
| 3,007,239 | 11/1961 | Lermont | 267—74 X |

ALEXANDER WYMAN, *Primary Examiner.*

HAROLD ANSHER, *Examiner.*